(12) United States Patent
Bosen et al.

(10) Patent No.: US 11,597,301 B1
(45) Date of Patent: Mar. 7, 2023

(54) WEIGHT SENSING ENERGY ATTENUATOR

(71) Applicant: Armorworks Holdings, Inc., Chandler, AZ (US)

(72) Inventors: David A. Bosen, Tempe, AZ (US); Nicholas M. Fulton-Manders, Chandler, AZ (US)

(73) Assignee: ArmorWorks Holdings, Inc., Chandler, AZ (US)

( * ) Notice: Subject to any disclaimer, the term of this patent is extended or adjusted under 35 U.S.C. 154(b) by 975 days.

(21) Appl. No.: 16/404,680

(22) Filed: May 6, 2019

Related U.S. Application Data

(60) Provisional application No. 62/667,243, filed on May 4, 2018.

(51) Int. Cl.
*B60N 2/02* (2006.01)
*B60N 2/00* (2006.01)
*G01G 3/14* (2006.01)
*B60N 2/50* (2006.01)

(52) U.S. Cl.
CPC ........... *B60N 2/0244* (2013.01); *B60N 2/002* (2013.01); *B60N 2/501* (2013.01); *G01G 3/14* (2013.01); *B60N 2002/0268* (2013.01)

(58) Field of Classification Search
CPC ...... B60N 2/0244; B60N 2/002; B60N 2/501; B60N 2002/0268; G01G 3/14
See application file for complete search history.

(56) References Cited

U.S. PATENT DOCUMENTS

| | | | |
|---|---|---|---|
| 5,558,301 A | 9/1996 | Kerdoncuff et al. | |
| 8,342,300 B2 | 1/2013 | Guillon | |
| 8,888,179 B1 | 11/2014 | Bosen et al. | |
| 9,969,307 B1 | 5/2018 | Bosen | |
| 10,161,469 B1* | 12/2018 | Bosen | B60N 2/42736 |
| 10,480,908 B2 | 11/2019 | Huang et al. | |
| 10,612,616 B1* | 4/2020 | Lou | F16F 7/123 |
| 2009/0045659 A1* | 2/2009 | List | B60N 2/42736 297/216.15 |
| 2011/0018302 A1* | 1/2011 | Endo | B60N 2/06 296/68.1 |
| 2012/0273649 A1 | 11/2012 | Mindel et al. | |

FOREIGN PATENT DOCUMENTS

| | | | | |
|---|---|---|---|---|
| DE | 19847603 A1 * | 4/2000 | ............ | B60N 2/002 |
| JP | 2003240632 A * | 8/2003 | ............ | B60N 2/002 |

\* cited by examiner

*Primary Examiner* — Milton Nelson, Jr.
(74) *Attorney, Agent, or Firm* — James L Farmer

(57) ABSTRACT

Method and apparatus are provided for a vehicle seat weight detection system utilizing a metal deformation type energy attenuating device disposed in a load path between a seat and a vehicle structure. The energy attenuating device includes a weight sensing portion with a first end connected to one of the seat or vehicle structure, and a second end configured to transfer the seat weight load to a deformable portion of the energy attenuating device connected to the other of the seat and vehicle structure. An aperture in the weight sensing portion between the first and second ends divides a region adjacent the aperture into first and second sides. A slot intersecting the aperture and lying on a plane generally perpendicular to the load path divides the second side into upper and lower halves. A sensor on a surface of the first side of the weight sensing portion is configured to detect strain variations in the surface and produce a calibrated weight signal.

20 Claims, 4 Drawing Sheets

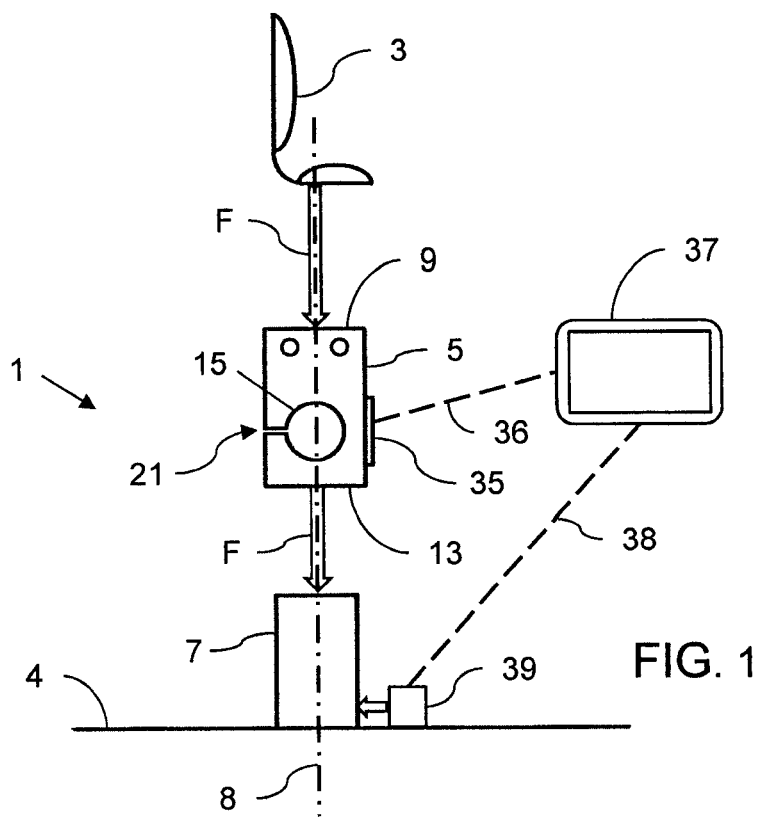
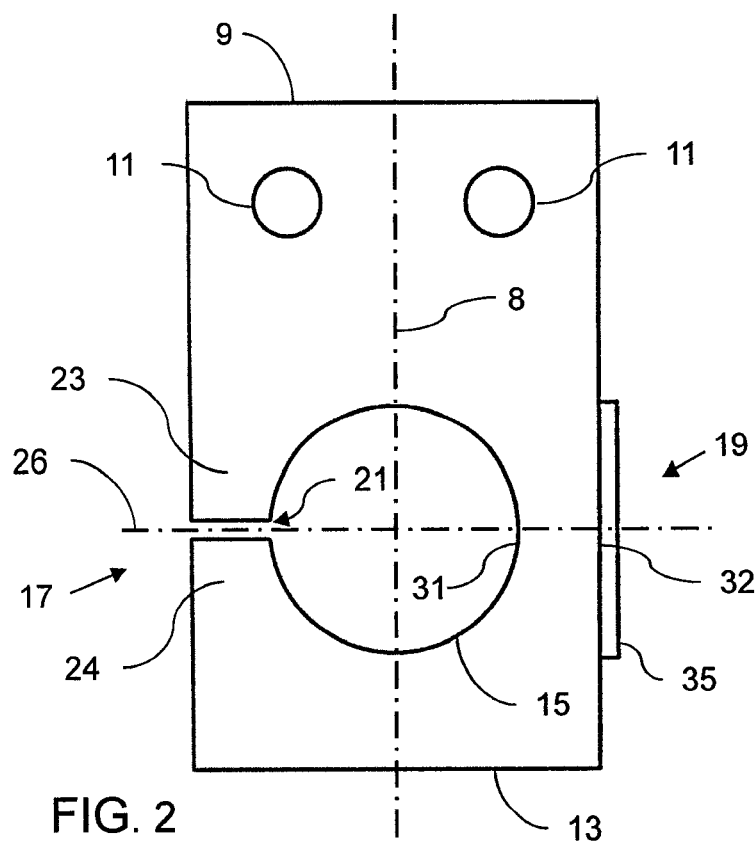

WEIGHT SENSING ENERGY ATTENUATOR

TECHNICAL FIELD

This application claims priority to Provisional patent application No. 62/667,243 entitled Weight Sensing Energy Attenuator, the entire contents of which are hereby incorporated by reference. The technical field of the present invention relates to the use of survivability systems in military vehicles, including the use of energy attenuating devices in shock absorbing seats.

BRIEF DESCRIPTION OF THE DRAWINGS

In the accompanying drawings:

FIG. 1 is a schematic representation of a vehicle seating system incorporating the weight sensing energy attenuator of the present disclosure;

FIG. 2 is a plan view of the weight sensing portion of the weight sensing energy attenuator;

DESCRIPTION OF THE EMBODIMENTS

Figure 3:
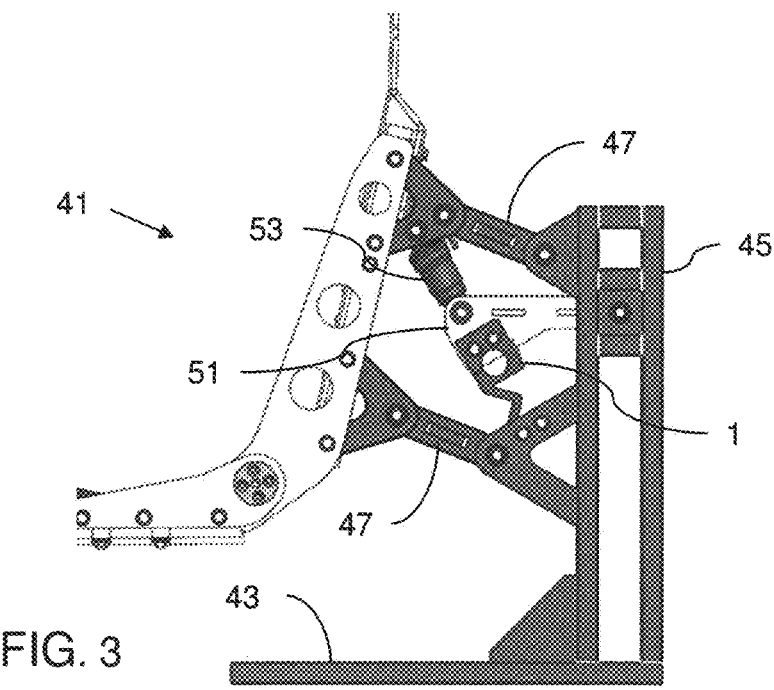
FIGS. 3 and 4 depict a particular embodiment of a vehicle seating system and weight sensing energy attenuator in which the energy attenuator is arranged in series with a shock and vibration absorber, and the weight sensing and deformable portions of the energy attenuator form a unitary contiguous component.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing figures, exemplary embodiments of a weight sensing energy attenuator in accordance with the present disclosure are illustrated and indicated generally at reference numeral 1. Energy attenuator 1 is any of a class of well-known devices that serve to mitigate the severity of an under-vehicle blast induced shock load experienced by a seated occupant in a vehicle. Such devices are configured to serve as a normally rigid part of the structure or load path supporting the seat from the vehicle floor or chassis, however with the ability to deform under extreme loading conditions and allow the seat to stroke.

Referring to FIG. 1, energy attenuator 1 is disposed between a vehicle seat 3 and chassis 4, and includes generally a weight sensing portion 5, and a deformable portion 7. The weight sensing portion 5 may be connected to the seat 3 and the deformable portion 7 connected to the vehicle chassis 4, as suggested in the depicted embodiment. Alternatively, the connection orientation could just as well be reversed, with the seat attached to the deformable portion, and the weight sensing portion attached to the vehicle chassis. The weight sensing and deformable portions may be configured as one integrated device, as in the deformable metal bar embodiment shown in FIGS. 3 and 4, or as separate elements configured to bear against one another, as in the mandrel and deformable frame embodiment shown in FIG. 8. In any case, both portions of energy attenuator 1 form a part of a load path between the vehicle seat and chassis, and both portions thus react any force exerted by the seat on the vehicle due to gravity and other road or blast caused accelerations. The energy attenuator is generally elongated and mounted such that a principal longitudinal direction or axis 8 of the device is in alignment with the seat to chassis load path (indicated by force arrows "F").

Referring now also to FIG. 2, the weight sensing portion 5 may be in the form of a simple rectangular plate or flange as shown, with a first end 9 configured for attachment to the vehicle seat or chassis, such as with bolt holes 11, and a second end 13 connected to or integral with the deformable portion 7 of the energy attenuator. An aperture 15 in weight sensing portion 5 between the first and second ends defines left and right lateral sides 17 and 19 respectively. In one embodiment a maximum lateral width of aperture 15 (or diameter if aperture 15 is a round hole) in a direction perpendicular to longitudinal axis 8, is more than half the lateral width of the weight sensing portion 5. In another embodiment the minimum lateral width of each of sides 17 and 19 is less than one fourth the lateral width of the weight sensing portion.

A gap 21 in the left side 17 of weight sensing portion 5 on a plane 26 perpendicular to longitudinal axis 8 separates the left side into upper and lower halves 23, and 24. In the depicted embodiment the gap 21 and aperture 15 together create a keyhole shaped opening. The width of gap 21, or in other words the distance between upper and lower halves 23, 24, is large enough to prevent the gap from completely closing due to any anticipated static load imparted by the seat and occupant for any particular configuration of weight sensing portion 5. Thus, in a non-moving vehicle, only the right side 19 provides an uninterrupted structural load path from the upper end 9 to the lower end 13 of weight sensing portion 5, and must therefore carry any compressive or tensile load applied to the energy attenuator.

However, because the sides 17, 19, are laterally offset from longitudinal axis 8 and the corresponding seat load path, any seat loading necessarily induces a bending moment in right side 19. For a compressive loading condition due to a downward seat load, the resulting bending moment tends to cause compression on the inner edge 31 of side 19, adjacent aperture 15, and tension along the opposite, outer edge 32, while the upper and lower halves 23, 34 of left side 17 tend to move toward each other and close gap 21. The weight sensing portion is configured such that the yield strength of the material is not exceeded under maximum anticipated static loading conditions, and thus the compressive or tensile strain in side 19 is always proportional to the seat loading in a non-moving vehicle. In one embodiment the weight sensing portion is configured such that tensile strain in side 19 remains proportional to the seat loading as long as gap 21 has not completely closed, or in other words, anytime up to the point at which upper and lower halves 23, 34 come into physical contact with each other.

A sensor 35 configured to detect mechanical strain may be attached to weight sensing portion proximate right side 19. The sensor may be, for example, a strain gauge attached to the outer edge 32 of right side 19, centered longitudinally about plane 26, and oriented to detect longitudinal strain variations caused for example by bending of side 19. The sensor may be calibrated in a conventional manner, such as by recording the strain readings as the seat is incrementally loaded with known weights.

A calibrated weight signal may be transmitted from sensor 35 through a link 36 to a properly configured display 37 (see FIG. 1) for use by vehicle crew in making corresponding adjustments to the energy attenuator 1 or other seating components. The display 37 may be mounted on the seat or vehicle and hardwire linked to the sensor. Alternatively, the display may comprise a wireless device such as a pad or cell phone configured with a custom app and linked to the sensor through a local wifi network. In such a wireless configuration, sensors from multiple seats may be connected through a signal processor to a modem capable of transmitting weight signal data from all of the seats simultaneously. Such components may be separate or integrated into a single device or computer. The display device, or app, may be accordingly configured to show seat identifying information, such as a seat number, along with a corresponding seat weight or seat adjustment values.

The weight or adjustment value may be used by vehicle crew to then adjust the response characteristics of the energy attenuator, and other components such as the vibration attenuating component 53 of the seating system discussed below. In one embodiment the adjustment is done manually, such as by operating a knob or lever to produce a calibrated movement of an adjustable element of the component.

Referring again to FIG. 1, in another embodiment adjustment is performed electro-mechanically through a dual-purpose display device 37 configured to transmit an adjustment signal 38 to an electro-mechanical adjustment mechanism 39. The display device 37 may be configured to transmit the adjustment signal only when commanded, such as when an operator physically activates a transmit button or icon feature on the display. Alternatively, the display device, or a dedicated signal processor, may be configured to transmit the adjustment signal automatically when the presence of a seated occupant in a non-moving vehicle is detected and a static weight determination established. The signal processor may be further configured to detect and appropriately deal with other related situations, such as for example, the seat occupant standing and then sitting again, changing seat occupants, or an occupant removing and storing gear after sitting in the seat. In one embodiment the signal processor is configured to determine a static seat load from a seat load that is continuously varying, such as from movement of the seat occupant, by calculating a mean, an average, or other statistical estimation of the static value over a suitable sampling period.

Figure 4:
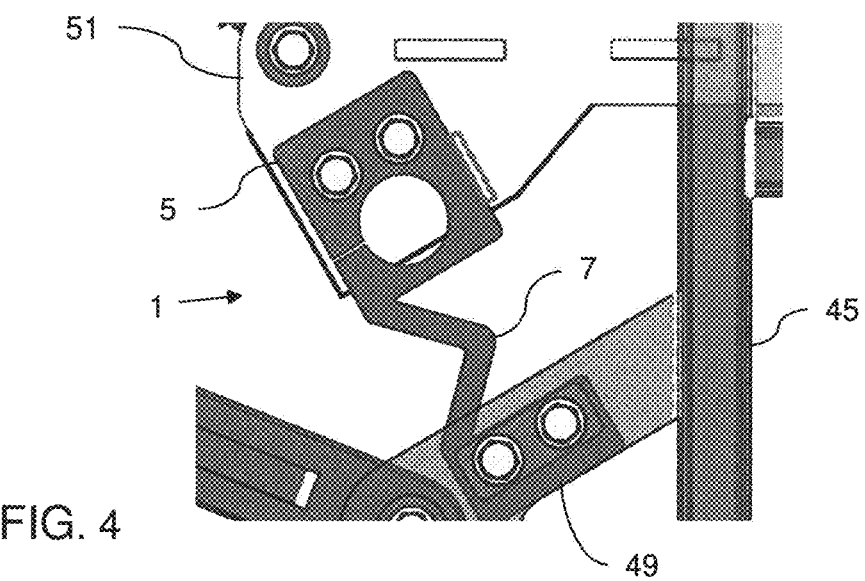

FIGS. 3 and 4 depict the energy attenuator 1 installed in an energy attenuating vehicle seat 41 configured to stroke toward the vehicle floor 43 in response to an under-vehicle blast event. In the depicted embodiment the seat stroking is enabled by a double wishbone type of seat mounting, with the seat supported from a vertical wall or frame 45 of the vehicle compartment by pairs of upper and lower pivot arms 47. A similar seat mounting arrangement is described in U.S. patent application Ser. No. 15/276,413 entitled "Pivot Arm Mounted Energy Attenuating Seat", assigned to the assignee of the present invention, the entire contents of which are hereby incorporated by reference.

As best seen in FIG. 4, the energy attenuator 1 combines the weight sensing portion 5 and the deformable portion 7 into one unitary contiguous part. The deformable portion 7 is in the form of an elongated metal bar with an upper end that merges into the lower end 13 of weight sensing portion 5, and a lower end configured as a flange 49 with bolt holes for attachment to frame 45. The elongated bar may have the zig-zag shape shown, in the manner of a known deformable energy attenuating device installed on numerous vehicle seating products made commercially available by Armorworks Enterprises, Inc. of Chandler, Ariz. under the trade name "Energy Attenuating Link", or "EA Link".

The weight sensing portion 5 attaches to a swing arm 51 that is pivoted to frame 45, and to an upper end of the seat with an adjustable shock/vibration absorber 53. When the seat pivots downward, the distance between the upper end of the seat and the fixed flange 49 of the energy attenuator necessarily must decrease, either by compressing the vibration absorber 53 or the energy attenuator 1, or both. Under normal operating conditions the energy attenuator 1 is configured to remain rigid and undeformed, while the vibration absorber may be tuned to absorb and attenuate road induced shocks and vibration. However, in an under-vehicle blast event, the vibration absorber 53 may become effectively rigid when subjected to the much higher than normal acceleration rates. In such circumstances, the seat downward stroke is substantially defined and limited by the amount the energy attenuator 1 is capable of compressing.

An equivalent serially arranged, vehicle seat vibration absorber and energy attenuator system is disclosed in U.S. patent application Ser. No. 15/483,985, entitled "Series Mounted Energy Attenuator and Spring Damper" assigned to the assignee of the present invention (hereinafter the '985 patent), the entire contents of which are hereby incorporated by reference. The '985 patent discusses in detail the behavior of the vibration attenuating portion of the system under normal operating conditions, as well as the relative compressive responses of both the vibration and energy attenuating portions in a high energy blast event.

Figure 5:
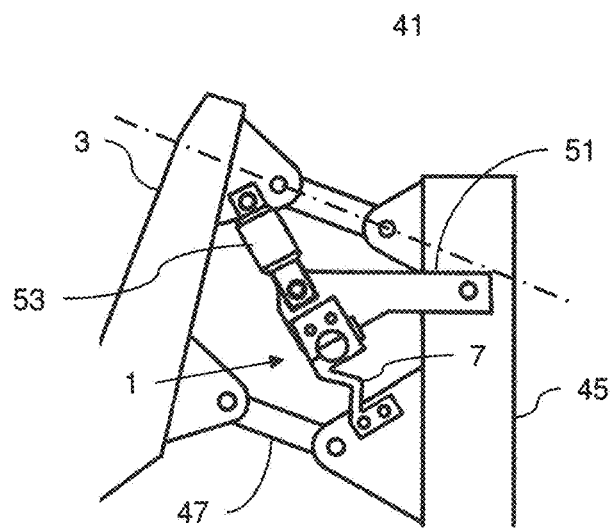
FIGS. 5 through 7 sequentially illustrate deformation of the deformable portion of the energy attenuator shown in the seating embodiment of FIG. 3 during a blast induced seat stroking event.
Figure 6:
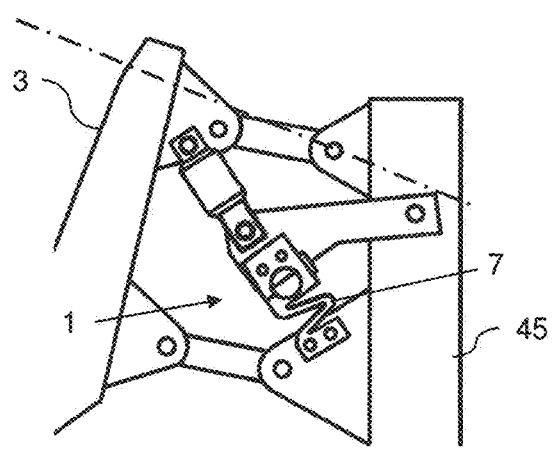
Figure 7:
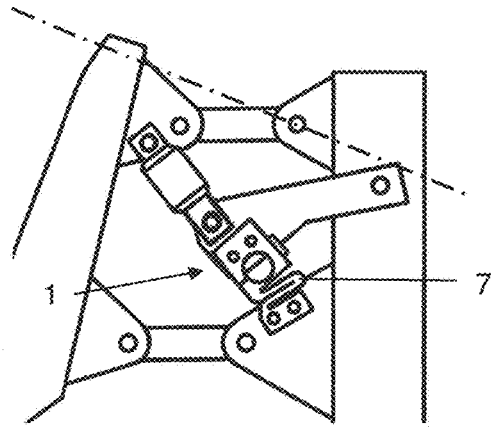

FIGS. 5 through 7 sequentially illustrate a seat stroking event in response to an under-vehicle blast in which the vibration absorber 53 is assumed rigid. In FIG. 5 the seat is shown in its normal, or upper most pivoted position, with the energy attenuator 1 in its original undeformed, maximum length condition. As the event progresses, the deformable portion 7 of the energy attenuator 1 begins to deform and fold as it decreases in length. Referring now to FIG. 6, the swing arms and seat have pivoted downward, while the length of the energy attenuator 1 has decreased by about half. Assuming enough remaining blast event energy, the seat stroking and energy attenuator deformation will continue until the energy attenuator is fully folded over and collapsed, as shown in FIG. 7. As discussed in the '985 patent, the efficiency of blast event energy attenuation is maximized when the event energy is fully attenuated precisely when the energy attenuator is fully collapsed and bottomed out.

As discussed above, the weight sensing portion 5 of energy attenuator 1 is configured to ensure that gap 21 remains open under static load conditions, and that the only load path from the seat to the deformable portion 7 of the energy attenuator is through the right side 19 of the weight sensing portion. In one embodiment the weight sensing portion is further configured so that gap 21 will close, and the upper and lower halves 23, 24 of left side 17 come into contact at a seat load level above static load conditions, but below that required to cause any permanent deformation of the deformable portion 7 of the energy attenuator. In that event, gap 21 will be closed when the seat strokes due to a blast event, providing a second load path through the left side 17 of the weight sensing portion.

Figure 8:
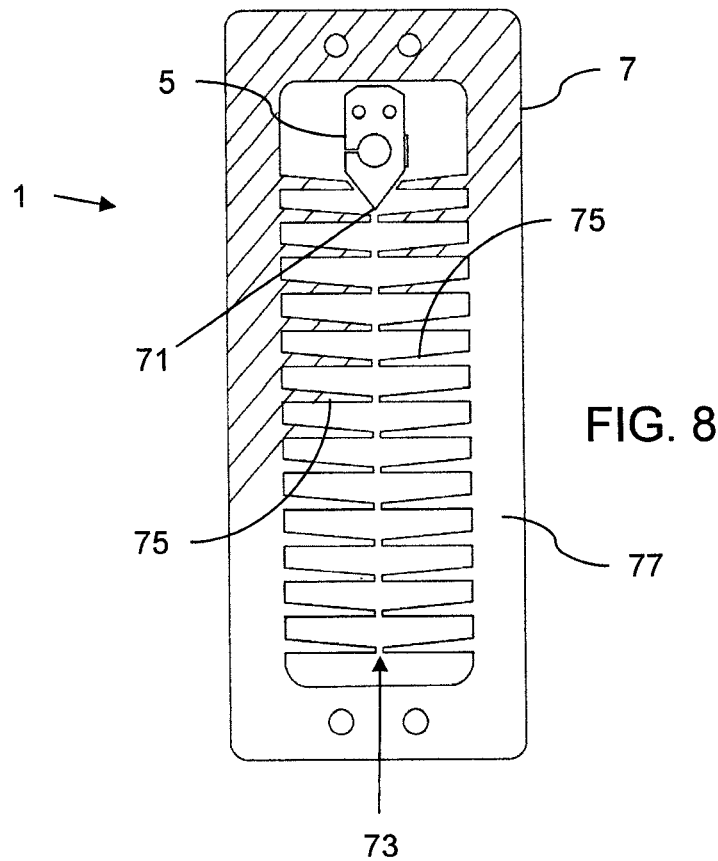
FIG. 8 is a plan view of another embodiment of the weight sensing energy attenuator with the weight sensing and deformable portions configured as separate components.
Figure 9:
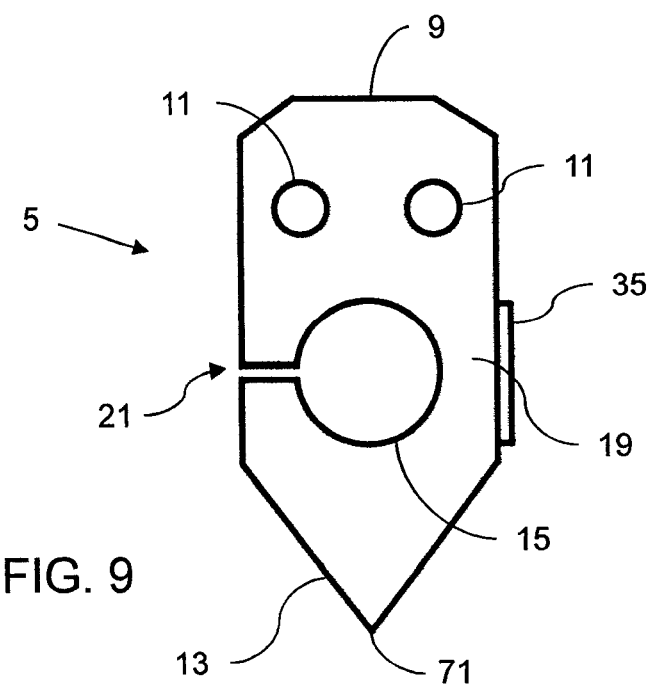
FIG. 9 is a close-up view of the weight sensing portion of the energy attenuator shown in FIG. 8.

Another embodiment of energy attenuator 1 with a weight sensing portion 5 and a deformable portion 7 is depicted in FIGS. 8 and 9. As in the above described embodiment, the weight sensing portion 5 has a sensor 35, a keyhole shaped opening defining an aperture 15 and gap 21, and bolt holes 11 for a connection to a vehicle seat or structure. The lower end 13 has a tapered shape that comes to a point 71. The weight sensing portion is positioned at one end of an elongated deformable portion 7, with the point 71 aimed down a slot 73 defined by two opposed rows of deformable teeth 75 extending inward from an outer frame 77 adapted for attachment to a vehicle seat or compartment. A similar energy attenuator configuration, but without the load sensing elements of the weight sensing portion, is disclosed in U.S. patent application Ser. No. 15/729,377, entitled "Slot Expanding Energy Attenuator", assigned to the assignee of the present invention, the entire contents of which are hereby incorporated by reference.

As described in the referenced application, a seat load creates a relative force between the weight sensing portion 5 and the deformable portion 7, that is reacted at the interface of the pointed lower end 13 of the weight sensing portion and the teeth 75 of the deformable portion. Thus in the embodiment of FIG. 8, the load path for any seat load under static loading conditions goes through the weight sensing portion from the upper end 9, through the right side 19, to the pointed lower end 13. Like the previously described embodiment, a static seat weight or adjustment value is again determined based on an output from sensor 35 proportional to the resulting bending moment in side 19, and to the seat load.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A vehicle seat weight detection system, comprising:
   a metal deformation type energy attenuating device disposed in a load path between a seat and a vehicle structure, the energy attenuating device comprising:
   a weight sensing portion with a first end connected to one of the seat or vehicle structure, and a second end configured to transfer a weight load of the seat to a deformable portion of the energy attenuating device connected to the other of the seat and vehicle structure;
   an aperture in the weight sensing portion between the first and second ends dividing a region of the weight sensing portion adjacent the aperture into first and second sides;
   a slot that intersects the aperture and lies on a plane generally perpendicular to the load path, the slot having a width and dividing the second side into upper and lower halves; and
   a sensor on a surface of the first side of the weight sensing portion configured to detect strain variations in the surface and produce a calibrated weight signal.

2. The vehicle seat weight detection system of claim 1, wherein the weight sensing portion is a metal plate with a width, and the aperture is circular with a diameter at least half the width measured at the slot.

3. The vehicle seat weight detection system of claim 1, wherein the sensor is a strain gauge oriented to detect longitudinal surface strain in the surface of the first side.

4. The vehicle seat weight detection system of claim 1, wherein the weight sensing portion is configured to ensure that a maximum bending stress in the first side corresponding to a defined maximum static seat load condition is below a yield strength of the material comprising the weight sensing portion.

5. The vehicle seat weight detection system of claim 1, wherein the weight sensing portion is configured such that as long as the width of the slot in the second side is greater than zero, tensile strain in the first side will be proportional to a compressive load applied to the weight sensing portion along the load path.

6. The vehicle seat weight detection system of claim 5, wherein the weight sensing and deformable portions are integral portions of a single contiguous energy attenuating device.

7. The vehicle seat weight detection system of claim 1, further comprising an electronic display configured to receive the calibrated weight signal and display one or both of a seat weight value or seat adjustment parameter.

8. The vehicle seat weight detection system of claim 7, wherein the electronic display is configured to simultaneously receive weight signals from sensors at a plurality of respective seats in a vehicle, and display seat weight values or seat adjustment parameters corresponding to the respective seats.

9. The vehicle seat weight detection system of claim 7, wherein the electronic display is configured to generate an adjustment signal based on the calibrated weight signal and transmit the adjustment signal to an electro-mechanical adjustment mechanism.

10. The vehicle seat weight detection system of claim 9, wherein the electronic display is configured to transmit the adjustment signal automatically when the presence of a seated occupant in a non-moving vehicle is detected and a static weight determination is established.

11. The vehicle seat weight detection system of claim 10, further comprising a vibration absorber disposed in the load path between the vehicle seat and the vehicle structure.

12. A vehicle seat weight detection system, comprising:
a weight sensing component with first and second ends, the first end connectable directly or indirectly to one of a seat in a vehicle or the vehicle;
an energy attenuating component with first and second ends, the first end configured to react to a weight load of the seat from the second end of the weight sensing component, and the second end connectable directly or indirectly to the other of the seat in the vehicle and the vehicle;
an aperture in the weight sensing component between the first and second ends dividing a region of the weight sensing component adjacent the aperture into first and second sides;
a slot that intersects the aperture and lies on a plane generally perpendicular to a load path of the weight load of the seat, the slot having a width and dividing the second side into upper and lower halves; and
a sensor on the first side of the weight sensing component configured to detect bending and produce a calibrated weight signal.

13. The vehicle seat weight detection system of claim 12, wherein the energy attenuating component is an elongated metal frame having a longitudinal slot disposed along a central axis of the frame, and wherein the weight sensing component is disposed at a first end of the longitudinal slot in the frame.

14. The vehicle seat weight detection system of claim 13, wherein the weight sensing component is wider than the longitudinal slot in the frame.

15. The vehicle seat weight detection system of claim 14, wherein the longitudinal slot in the frame is defined by two opposed rows of deformable teeth extending inward from side portions of the frame.

16. A method for determining a static weight load imparted to a vehicle structure by a vehicle seat, the method comprising the steps of:
mounting a metal deformation type energy attenuating device in a load path between the vehicle seat and structure;
defining a weight sensing portion of the energy attenuating device having first and second sides disposed about a central aperture;
forming a slot in the second side that intersects the aperture and lies on a plane generally perpendicular to the load path, the slot having a width and dividing the second side into upper and lower halves;
detecting bending on the first side of the weight sensing portion with a sensor; and
generating a calibrated weight signal with the sensor.

17. The method of claim 16, wherein the calibrated weight signal is proportional to the seat weight load if the width of the slot is greater than zero.

18. The method of claim 16, further comprising the steps of:
transmitting the calibrated weight signal to an electronic display; and
displaying one or both of a seat static weight value or a seat adjustment parameter.

19. The method of claim 16, further comprising the steps of:
detecting a presence of a seat occupant in the seat when the vehicle is stationary;
automatically transmitting an adjustment signal to the seat.

20. The method of claim 19, further comprising the step of determining a static load based on a statistical calculation using a sample of seat load values detected over a sampling period.

* * * * *